United States Patent
Lange

[11] Patent Number: 5,901,343
[45] Date of Patent: May 4, 1999

[54] ADAPTIVE CROSS POLARIZATION INTERFERENCE CANCELER FOR USE AT INTERMEDIATE FREQUENCIES

[75] Inventor: Julius Lange, Cupertino, Calif.

[73] Assignee: Lockheed Martin Corporation, Bethesda, Md.

[21] Appl. No.: 08/853,198

[22] Filed: May 9, 1997

[51] Int. Cl.$^6$ .................................................. H04B 1/10
[52] U.S. Cl. ........................... 455/63; 455/307; 455/304; 455/278.1
[58] Field of Search ............................. 455/63, 296, 303, 455/304, 305, 306, 307, 278.1; 342/363, 364, 365, 366, 375; 375/347, 346, 350, 229, 230; 359/191, 192

[56] References Cited

U.S. PATENT DOCUMENTS

| | | | |
|---|---|---|---|
| 3,995,271 | 11/1976 | Goggins, Jr. ............................. | 342/91 |
| 5,241,320 | 8/1993 | Mizoguchi ......................... | 455/296 X |
| 5,524,125 | 6/1996 | Tsujimoto ............................ | 455/278.1 |
| 5,537,443 | 7/1996 | Yoshino et al. ........................ | 375/340 |
| 5,710,799 | 1/1998 | Kobayashi ......................... | 455/296 X |
| 5,740,208 | 4/1998 | Hulbert et al. .......................... | 375/346 |

Primary Examiner—Wellington Chin
Assistant Examiner—Yemane Woldetatios
Attorney, Agent, or Firm—Kenneth W. Float

[57] ABSTRACT

An intermediate frequency adaptive cross polarization interference canceler for processing an interfering cross polarization signal distorted by dispersion. The canceler has right and left inputs for respectively receiving right and left polarized IF input signals. A plurality of serially coupled complex multiplier and control stages respectively process the right and left polarized signals to provide controlled amounts of coupling between them to cancel cross polarization interference therebetween. A plurality of delay lines add predetermined time shifts to the right and left polarized signals between stages, and which forms a transversal filter having a predetermined number of taps. The canceler outputs right polarized IF output signal and a left polarized IF output signal having substantially no cross polarization interference therebetween. A preferred embodiment of the adaptive cross polarization interference canceler uses a compensating five-tap transversal filter disposed in the cancellation path. A simplified single tap adaptive cross polarization interference canceler may be used if there is no dispersion.

16 Claims, 5 Drawing Sheets

ADAPTIVE CROSS POLARIZATION INTERFERENCE CANCELER FOR USE AT INTERMEDIATE FREQUENCIES

BACKGROUND

The present invention relates generally to a interference cancelers, and more particularly, to an adaptive cross polarization interference canceler for use at intermediate frequencies.

In satellite communications the quest for ever increasing data rate limited bandwidth has led to the reuse of frequencies through polarization diversity. Under certain adverse conditions this reuse of frequencies requires the use of an adaptive cross polarization interference canceler. Since the interfering cross polarization signal might be distorted by dispersion, a compensating transversal filter is sometimes included in the cancellation path of the adaptive cross polarization interference canceler.

A search was performed that uncovered a number of prior art patents that are only generally related to the present invention. The present intermediate frequency adaptive cross polarization interference canceler differs from these prior art patents as indicated below.

The intermediate frequency adaptive cross polarization interference canceler is not an adaptive filter. In particular, the interference canceler always processes two signals not one. The prior art patents relating to adaptive filters include U.S. Pat. No. 4,453,256, U.S. Pat. No. 5,228,060, U.S. Pat. No. 3,659,229, U.S. Pat. No. 4,271,525, U.S. Pat. No. 4,760,596, U.S. Pat. No. 4,691,176, U.S. Pat. No. 3,878,468, U.S. Pat. No. 4,422,175, U.S. Pat. No. 5,278,780, U.S. Pat. No. 4,731,834, U.S. Pat. No. 4,320,526, U.S. Pat. No. 5,282,023, U.S. Pat. No. 5,311,546, U.S. Pat. No. 4,097,807, U.S. Pat. No. 5,285,482, U.S. Pat. No. 5,418,816, U.S. Pat. No. 5,394,110, U.S. Pat. No. 4,562,312, U.S. Pat. No. 4,281,411, U.S. Pat. No. 4,513,429, U.S. Pat. No. 4,594,725, U.S. Pat. No. 5,228,058, U.S. Pat. No. 5,036,525, U.S. Pat. No. 4,742,510, U.S. Pat. No. 5,311,558, U.S. Pat. No. 3,715,670, U.S. Pat. No. 5,481,564, and U.S. Pat. No. 5,442,582.

The present intermediate frequency adaptive cross polarization interference canceler and its adaptive control are completely self-contained and independent from the rest of the receiver. This means that adaptation can commence before signal acquisition, which shortens the total acquisition time considerably, which is an important feature when the canceler is used in a satellite modem application. The referenced circuits, which are different from the present invention and which are dependent on another portion of the receiver include U.S. Pat. No. 5,383,224, U.S. Pat. No. 4,914,676, U.S. Pat. No. 4,992,798, U.S. Pat. No. 5,432,522, U.S. Pat. No. 5,075,697, U.S. Pat. No. 5,442,663, U.S. Pat. No. 4,910,468, U.S. Pat. No. 5,327,458, U.S. Pat. No. 5,272,663, U.S. Pat. No. 4,283,795, U.S. Pat. No. 5,406,589, U.S. Pat. No. 4,701,935, U.S. Pat. No. 4,664,562, and U.S. Pat. No. 4,146,893.

Other prior art patents found in the search address a large variety of subjects that are not related to the present intermediate frequency adaptive cross polarization interference canceler in a variety of ways. These patents include U.S. Pat. No. 4,947,361 which deals with CW interference only. U.S. Pat. No. 5,084,902 cancels jitter due to very low frequency interference. U.S. Pat. No. 5,440,308 requires prior knowledge about the nature of the interference. U.S. Pat. No. 4,631,734 requires external computational resources. U.S. Pat. No. 4,293,945 only measures the depolarization, but does nothing about it. U.S. Pat. No. 4,320,535 requires external computational resources. U.S. Pat. No. 4,191,926 deals only with constant envelope signals. U.S. Pat. No. 4,369,519 deals with compensation not cancellation.

Accordingly, it is an objective of the present invention to provide for an adaptive cross polarization interference canceler for use at intermediate frequencies that is particularly well suited for use in satellite modems, and the like.

SUMMARY OF THE INVENTION

To meet the above and other objectives, the present invention provides for an intermediate frequency adaptive cross polarization interference canceler that is used to process an interfering cross polarization signal distorted by dispersion. A preferred embodiment of the adaptive cross polarization interference canceler uses a compensating five-tap transversal filter disposed in the cancellation path. However, it is to be understood that a simplified single tap adaptive cross polarization interference canceler may be used if there is no dispersion.

The present adaptive cross polarization interference canceler is designed for use at intermediate frequencies (IF) and is particularly well suited for use in high data rate digital satellite modems. The present invention is based on a transversal filter allrate equalizer at intermediate frequencies described in U.S. Pat. No. 5,442,582, issued Aug. 15, 1995 and assigned to the assignee of the present invention. The present adaptive cross polarization interference canceler is adaptive and two new features have been added to the equalizer of U.S. Pat. No. 5,442,582 which greatly improve its manufacturability and maintenance. These improvements include a serial arrangement of stages controlling tap weights, and a gain-phase adjustment circuit.

The intermediate frequency cross polarization interference canceler has a number of advantages over other implementations. The intermediate frequency cross polarization interference canceler has clear advantages for signal acquisition and data reception in the presence of high cross polarization interference, high distortion, and high noise. Since interference cancellation at IF precedes clock and carrier recovery, phase locked loop (PLL) circuits in the carrier recovery circuit are presented with a signal free from cross polarization interference.

In contrast to other methods of adaptive control, such as dithering algorithms for example, adaptation can commence before signal acquisition, since the intermediate frequency cross polarization interference canceler and its adaptive control are completely self-contained and independent from the rest of the receiver. For this reason, there also is no need to readjust the equalizer when the data rate is changed, especially if a simplified single tap cross polarization interference canceler is used.

The serial arrangement of stages and delay lines has great advantages over a parallel arrangement, referred to as "organ pipes", because each multiplier and its associated correlator are located next to each other in the same stage. This makes each tap independent and any delay and phase matching is done internal to each self-contained stage. Thus, each stage is aligned and then simply inserted into the IF adaptive cross polarization interference canceler without any further adjustments.

The gain-phase adjustment circuit greatly improves the ability to build and maintain the intermediate frequency cross polarization interference canceler. If no gain-phase adjustment circuit is used, the delay lines shown in FIG. 3 must be adjusted to within 9° at the carrier frequency, which corresponds to 5 psec. When the gain-phase adjustment circuit is used, the delay line adjustment only needs to be within 0.1 tap spacing, which equals 100 psec.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
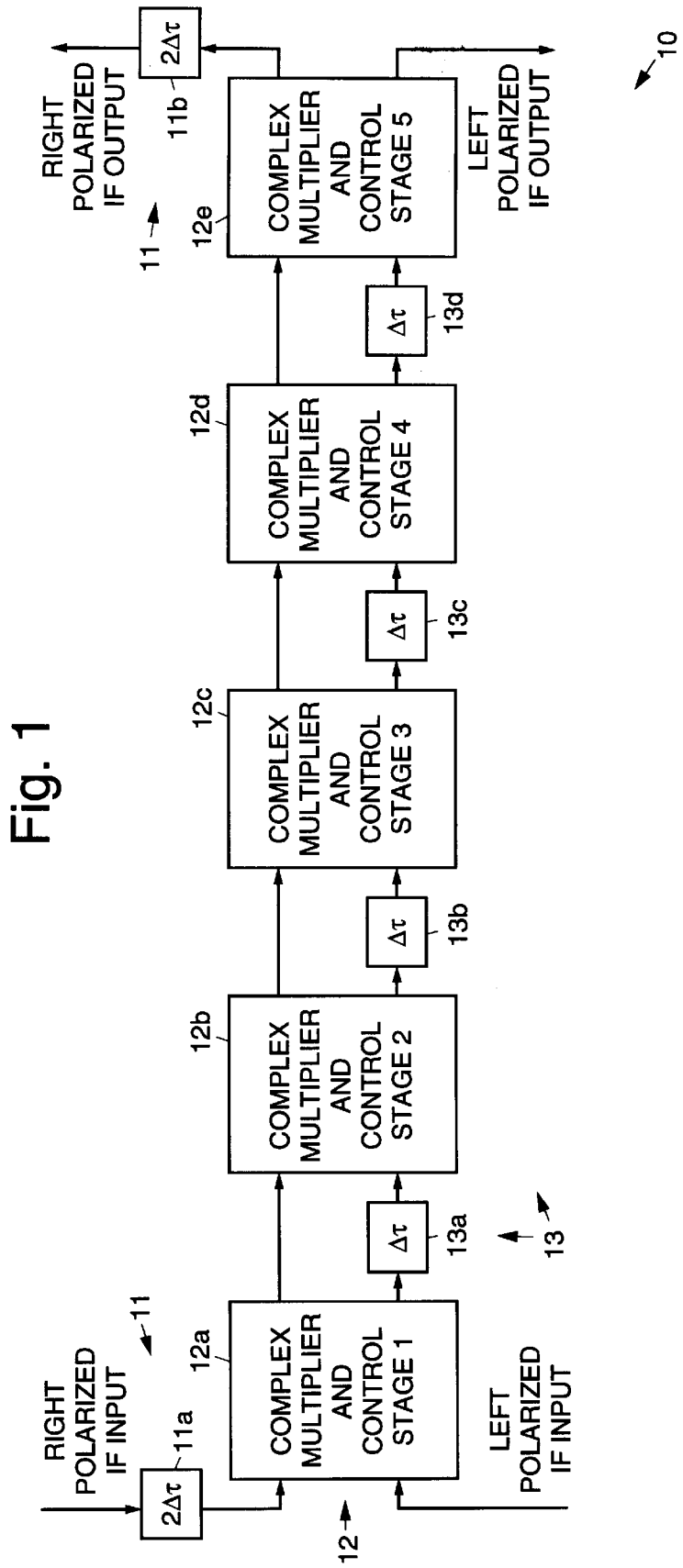
FIG. 1 is a block diagram illustrating a first embodiment an intermediate frequency adaptive cross polarization interference canceler in accordance with the principles of the present invention.

Referring to the drawing figures, FIG. 1 is a block diagram illustrating a first embodiment an intermediate frequency adaptive cross polarization interference canceler 10 in accordance with the principles of the present invention. The intermediate frequency adaptive cross polarization interference canceler 10 has two inputs, for receiving a right polarized IF input signal and a left polarized IF input signal, and two corresponding right and left polarized outputs. The right polarized and left polarized signals pass through five complex multiplier and control stages 12a, 12b, 12c, 12d, 12e, that each provide controlled and predetermined amounts of coupling between the right and left polarized signals to cancel cross polarization interference. Delay lines 11a, 13a 13b, 13c, 13d, 11b (2Δτ and Δτ), provide appropriate time shifts between the right and left polarized signals.

In the first control stage 12a, the left polarized signal is 2Δτ ahead of the right polarized signal. In the second control stage 12b, the left polarized signal is Δτ ahead of the right polarized signal. In the third control stage 12c, the left polarized signal is in step with the right polarized signal. In the fourth control stage 12d, the left polarized signal is Δτ behind the right polarized signal. In the fifth control stage 12e, the left polarized signal is 2Δτ behind the right polarized signal. These time shifts effectively introduce a five tap transversal filter into the cross coupled signal path, with the third control stage 12c corresponding to a punctual tap. This accommodates both time shifts and dispersive effects.

Figure 2:
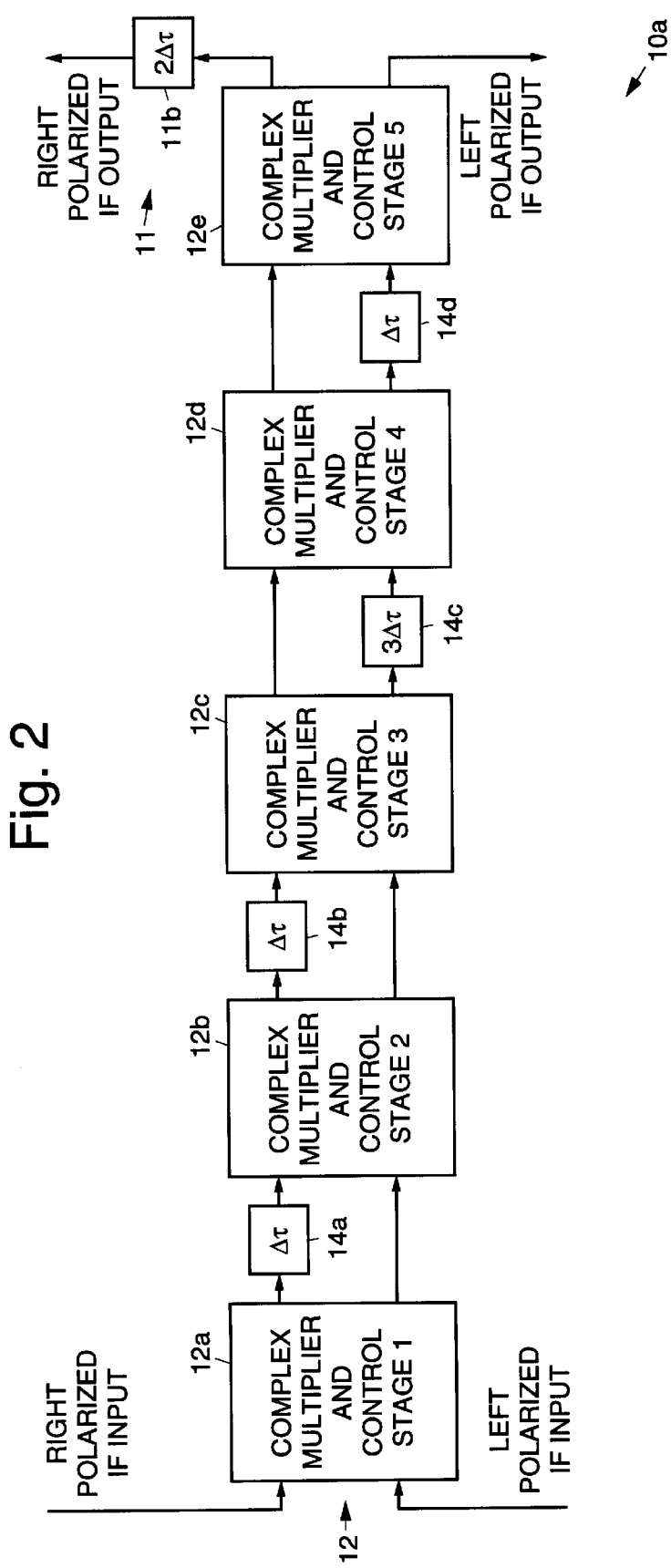
FIG. 2 is a block diagram illustrating a second embodiment an intermediate frequency adaptive cross polarization interference canceler in accordance with the principles of the present invention.

It should be noted that the delay lines do not have to be in the exact locations shown in FIG. 1. The same effect may be produced with several other arrangements, such as the one shown in FIG. 2, which shows a second embodiment of the present invention, where the first control stage 12a corresponds to the punctual tap and the time shifts are as follows. In the first control stage 12a the left polarized signal is in step with the right polarized signal. In the second control stage 12b the left polarized signal is Δτ ahead of the right polarized signal. In the third control stage 12c the left polarized signal is 2Δτ ahead of the right polarized signal. In the fourth control stage 12d the left polarized signal is Δτ behind the right polarized signal. In the fifth control stage 12e the left polarized signal is 2Δτ behind the right polarized signal.

Figure 3:
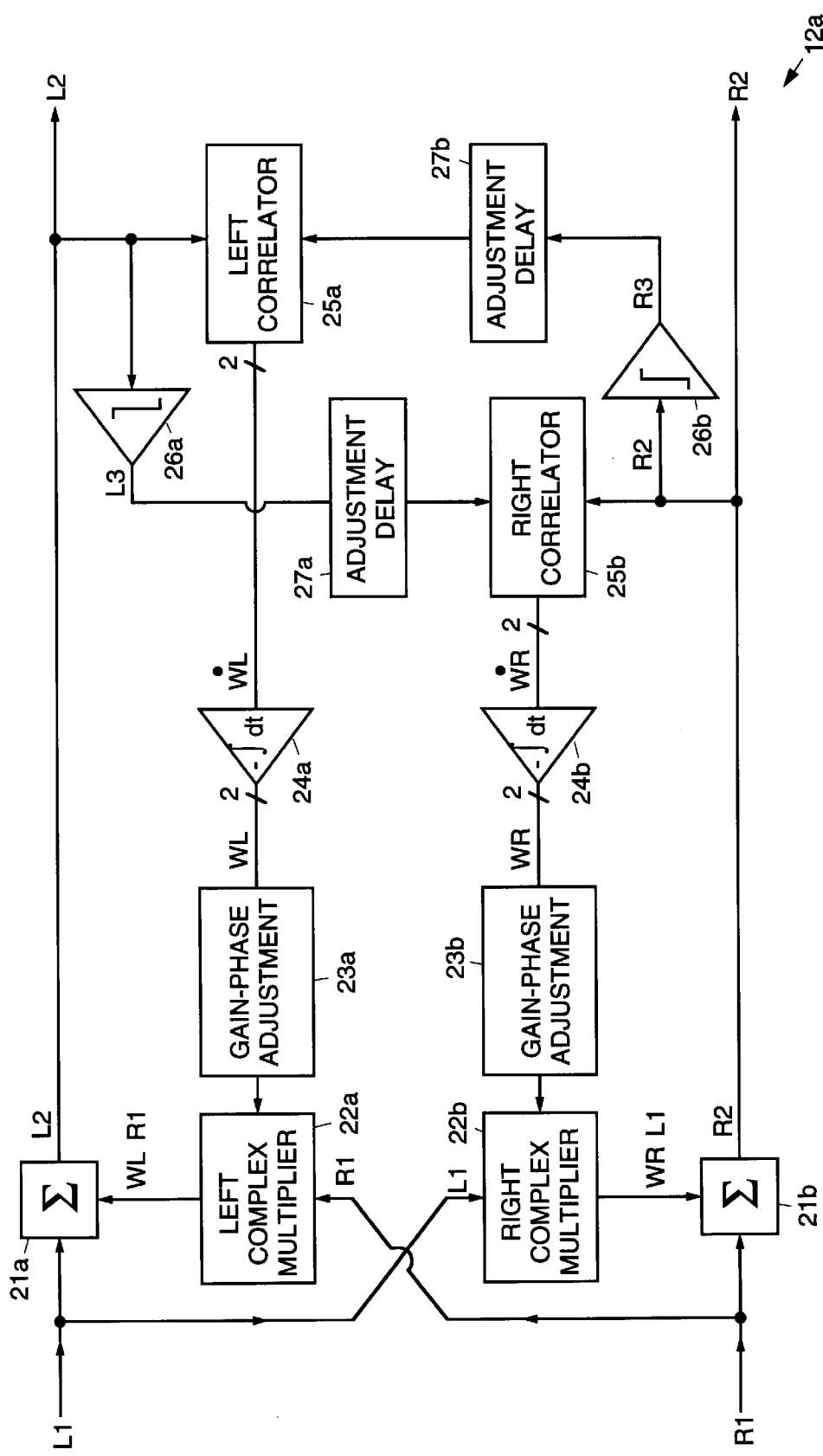
FIG. 3 is a block diagram illustrating a complex multiplier and control stage of the intermediate frequency adaptive cross polarization interference canceler.

FIG. 3 shows a block diagram of each complex multiplier and control stage 12a–12e used in the intermediate frequency adaptive cross polarization interference canceler 10, 10a. Each complex multiplier and control stage 12a–12e comprises left and right summing devices 21a, 21b which receive the left and right input signals, respectively, at first inputs thereof. The output of the left summing device 21a is coupled to a left correlator 25a and left amplitude limiter 26a. The output of the left correlator is coupled through a left integrator 24a, a left gain-phase adjustment circuit 23a and a left complex multiplier 22a. The output of the left amplitude limiter 26a is coupled through a left adjustment delay circuit 27a to a right correlator 25b. The right input signal is coupled to the left complex multiplier 22a which processes the signals applied thereto and supplies a combined output signal to a second input of the left summing device 21a.

The output of the right summing device 21b is coupled to the right correlator 25b and right amplitude limiter 26b. The output of the right correlator is coupled through a right integrator 24b, a right gain-phase adjustment circuit 23b and a right complex multiplier 22b. The output of the right amplitude limiter 26b is coupled through a right adjustment delay circuit 27b to the left correlator 25a. The left input signal is coupled to the right complex multiplier 22b which processes the signals applied thereto and supplies a combined output signal to a second input of the right summing devices 21b.

Each complex multiplier and control stage 12a–12e performs the following functions. The left polarized input signal, L1, is sent to the right complex multiplier 22b, which multiplies it by a complex number, WR, which is the tap weight. The resulting product of the left polarized input signal and the tap weight, WR L1, is then added to the right polarized input signal, R1, to form the right polarized output signal. R2. A left polarized output signal, L2, is produced in a similar manner. R2 and L2 are then passed through the amplitude limiters 26a, 26b to produce signals R3 and L3.

The right correlator 25b receives both the R2 signal and the L3 signal and produces in-phase and quadrature outputs that are proportional to the correlation between the two signals. If the correlation is zero, the cross polarization interference component corresponding to this particular time shift has been successfully canceled. The outputs of the right correlator 25b are integrated by the right integrator 24b to produce the tap weight, WR. Thus the loop is closed for adaptive cross polarization interference cancellation. The right gain-phase adjustment circuit 23b is interposed between the right integrator 24b and the right complex multiplier 22b to aid the operation of the loop, as will be explained below. The left correlator 22a produces the other tap weight, WL, in a similar manner.

Figure 4:
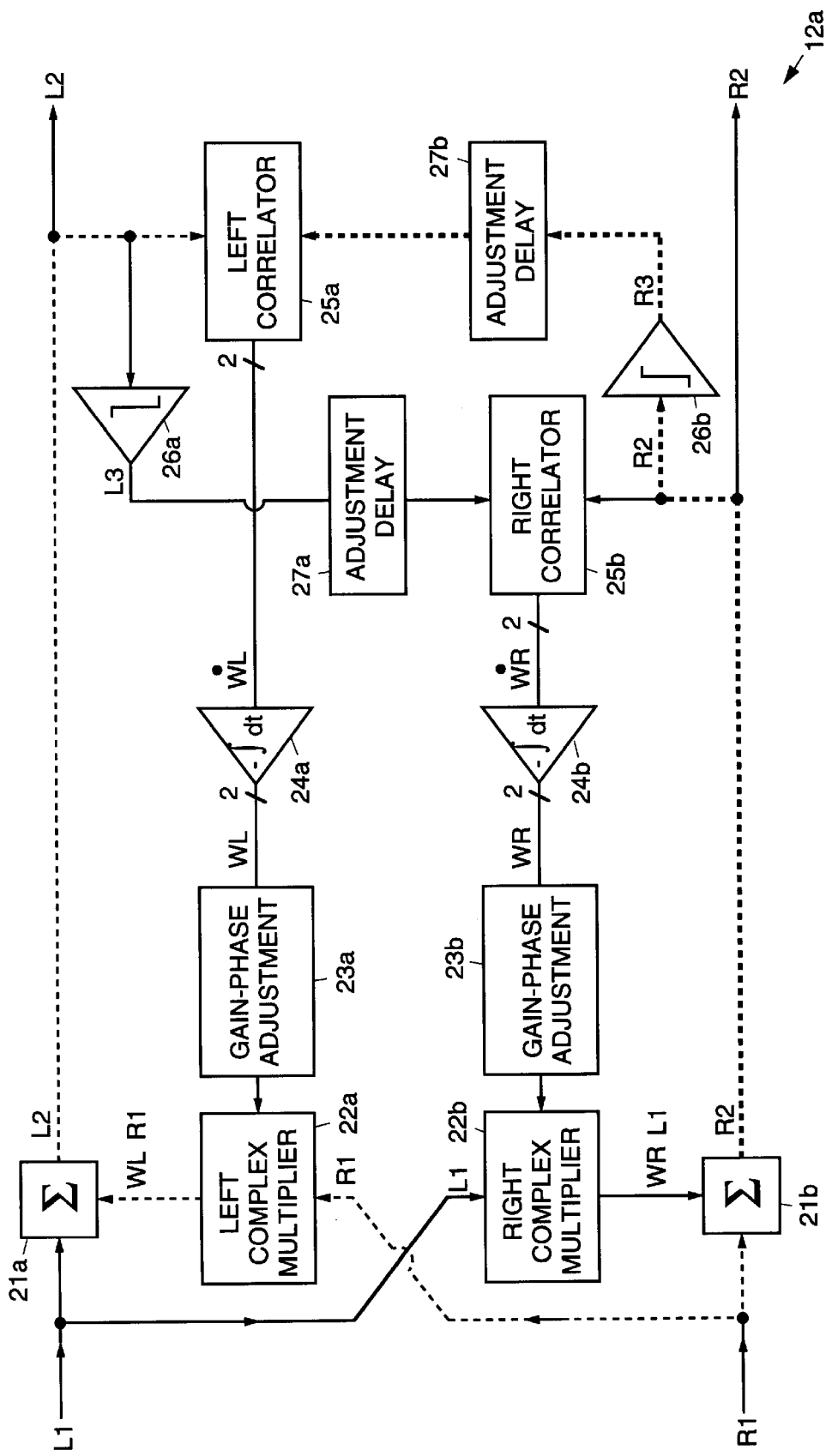
FIG. 4 shows equal delay paths of the complex multiplier and control stage shown in FIG. 3.

For proper operation of the adaptive loops, the time delays provided by the adjustment delay circuits 27a, 27b must be accurately adjusted. FIG. 4 shows the two paths that must be adjusted for equal delay, for the left multiplier 22a and the left correlator 25a to work together properly. A similar situation exists for the right multiplier 22b and the right correlator 25b. For a typical application the pertinent delay parameters are as follows. The symbol rate=1.0 Gsymbol/second. The symbol period=1000 psec. The maximum delay error=0.1 symbol period=100 psec. The carrier frequency= 5.0 GHz. The maximum phase error=9°. The time delay for 9° at 5.0 GHz=5 psec.

Figure 5:
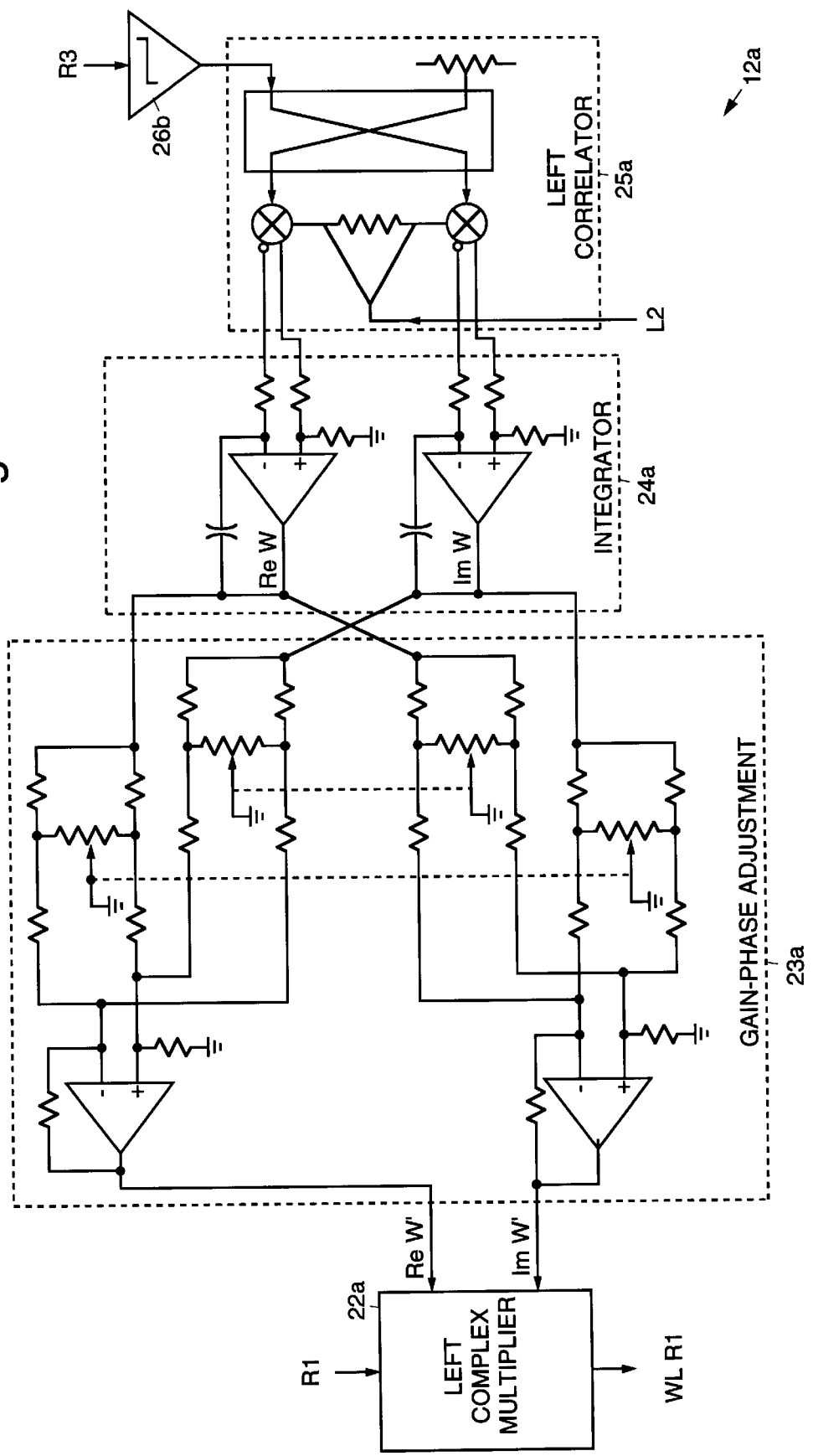
FIG. 5 shows a detailed diagram of a portions of a the complex multiplier and control stage, illustrating the gain-phase adjustment circuit and surrounding circuits.

FIG. 5 shows a detailed diagram of a portion of the complex multiplier and control stage 12a illustrating the gain-phase adjustment circuit 23a, 23b and surrounding circuits. The purpose of the gain-phase adjustment circuit 23a, 23b is to align the phases of the correlator 25a, 25b and the complex multiplier 22a, 22b with respect to each other, as referred to the 5 GHz carrier and to adjust the gain of the adaptive loop. If no gain-phase adjustment circuit 23a, 23b is used, the delay lines (adjustment delay circuits 25a, 25b shown in FIG. 4 must be adjusted to within 9° at the carrier frequency, which corresponds to 5 psec. If the gain-phase adjustment circuit 23a, 23b is used, the delay line adjustment only needs to be within 0.1 tap spacing, which equals 100 psec.

The gain-phase adjustment is achieved by taking the two outputs of the integrator 24a, 24b, ReW and ImW, and generating modified weights, ReW' and ImW'. In the simplified implementation shown in FIG. 5, there are two manual adjustments, wherein one pair of ganged potentiometers sets ReW to ReW' and ImW to ImW' gain, another pair of ganged potentiometers sets the ImW to ReW' and ReW to ImW' gain. In practice, more complicated computer controlled circuits may be used in place of the ganged potentiometers.

Thus, each stage is aligned and then is simply inserted into the intermediate frequency adaptive cross polarization interference canceler 10, 10a without any further adjustments. The gain-phase adjustment circuit 23a, 23b greatly improves the ability to build and maintain the intermediate frequency adaptive cross polarization interference canceler 10, 10a. Use of the gain-phase adjustment circuit 23b allows the delay line adjustment to be within 0.1 tap spacing.

Thus, an adaptive cross polarization interference canceler for use at intermediate frequencies that is particularly well suited for use in satellite modems, and the like has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An intermediate frequency adaptive cross polarization interference canceler comprising:

right and left inputs for respectively receiving right and left polarized IF input signals;

a plurality of serially coupled complex multiplier and control stages that each provide controlled and predetermined amounts of coupling between the right and left polarized signals to cancel cross polarization interference therebetween;

a plurality of delay lines respectively coupled between the plurality of serially coupled complex multiplier and control stages that provide predetermined time shifts between the right and left polarized signals, and which comprise a transversal filter having a predetermined number of taps; and right and left polarized outputs for outputting right polarized IF output signal and a left polarized IF output signal having substantially no cross polarization interference therebetween.

2. The interference canceler of claim 1 wherein the plurality of serially coupled complex multiplier and control stages comprise five complex multiplier and control stages, and wherein the plurality of delay lines provide a five tap transversal filter.

3. The interference canceler of claim 2 wherein the left polarized signal is $2\Delta\tau$ ahead of the right polarized signal in the first control stage, the left polarized signal is $\Delta\tau$ ahead of the right polarized signal in the second control stage, the left polarized signal is in step with the right polarized signal in the third control stage, the left polarized signal is $\Delta\tau$ behind the right polarized signal in the fourth control stage, and the left polarized signal is $2\Delta\tau$ behind the right polarized signal in the fifth control stage.

4. The interference canceler of claim 1 wherein the left polarized signal is in step with the right polarized signal in the first control stage, the left polarized signal is $\Delta\tau$ ahead of the right polarized signal in the second control stage, the left polarized signal is $2\Delta\tau$ ahead of the right polarized signal in the third control stage, the left polarized signal is $\Delta\tau$ behind the right polarized signal in the fourth control stage, and the left polarized signal is $2\Delta\tau$ behind the right polarized signal in the fifth control stage.

5. The interference canceler of claim 1 wherein each complex multiplier and control stage comprises:

left and right summing devices for receiving the left and right input signals, respectively, at first inputs thereof;

left and right correlators respectively coupled to outputs of the left and right summing devices;

left and right amplitude limiters respectively coupled to outputs of the left and right summing devices, and wherein respective outputs of the left and right amplitude limiters are coupled by way of left and right adjustment delay circuits to second inputs of the right and left correlators, respectively;

left and right integrators respectively coupled to outputs of the left and right correlators;

left and right gain-phase adjustment circuits respectively coupled to outputs of the left and right integrators;

left and right complex multipliers respectively coupled to outputs of the left and right gain-phase adjustment circuits and whose respective outputs are coupled to second inputs of the respective left and right summing devices.

6. The interference canceler of claim 5 wherein the gain-phase adjustment circuits align the phases of the correlator and the complex multiplier with respect to each other.

7. An intermediate frequency adaptive cross polarization interference canceler comprising:

right and left inputs for respectively receiving right and left polarized IF input signals;

five serially coupled complex multiplier and control stages that each provide controlled and predetermined amounts of coupling between the right and left polarized signals to cancel cross polarization interference therebetween;

a plurality of delay lines respectively coupled between the plurality of serially coupled complex multiplier and control stages that provide predetermined time shifts between the right and left polarized signals, and which comprise a five tap transversal filter having a predetermined number of taps; and right and left polarized outputs for outputting right polarized IF output signal and a left polarized IF output signal having substantially no cross polarization interference therebetween.

8. The interference canceler of claim 7 wherein the left polarized signal is $2\Delta\tau$ ahead of the right polarized signal in the first control stage, the left polarized signal is $\Delta\tau$ ahead of the right polarized signal in the second control stage, the left polarized signal is in step with the right polarized signal in the third control stage, the left polarized signal is $\Delta\tau$ behind the right polarized signal in the fourth control stage, and the left polarized signal is $2\Delta\tau$ behind the right polarized signal in the fifth control stage.

9. The interference canceler of claim 7 wherein the left polarized signal is $2\Delta\tau$ ahead of the right polarized signal in the first control stage, the left polarized signal is $\Delta\tau$ ahead of the right polarized signal in the second control stage, the left polarized signal is in step with the right polarized signal in the third control stage, the left polarized signal is $\Delta\tau$ behind the right polarized signal in the fourth control stage, and the left polarized signal is $2\Delta\tau$ behind the right polarized signal in the fifth control stage.

10. The interference canceler of claim 7 wherein each complex multiplier and control stage comprises:

left and right summing devices for receiving the left and right input signals, respectively, at first inputs thereof;

left and right correlators respectively coupled to outputs of the left and right summing devices;

left and right amplitude limiters respectively coupled to outputs of the left and right summing devices, and wherein respective outputs of the left and right amplitude limiters are coupled by way of left and right adjustment delay circuits to second inputs of the right and left correlators, respectively;

left and right integrators respectively coupled to outputs of the left and right correlators;

left and right gain-phase adjustment circuits respectively coupled to outputs of the left and right integrators;

left and right complex multipliers respectively coupled to outputs of the left and right gain-phase adjustment circuits and whose respective outputs are coupled to second inputs of the respective left and right summing devices.

11. The interference canceler of claim 10 wherein the gain-phase adjustment circuits align the phases of the correlator and the complex multiplier with respect to each other.

12. An intermediate frequency adaptive cross polarization interference canceler comprising:

right and left inputs for respectively receiving right and left polarized IF input signals;

five serially coupled complex multiplier and control stages that each provide controlled and predetermined amounts of coupling between the right and left polarized signals to cancel cross polarization interference therebetween;

a plurality of delay lines respectively coupled between the plurality of serially coupled complex multiplier and control stages that provide predetermined time shifts between the right and left polarized signals, and which comprise a five tap transversal filter having a predetermined number of taps; and right and left polarized outputs for outputting right polarized IF output signal and a left polarized IF output signal having substantially no cross polarization interference therebetween; and wherein the left polarized signal is in step with the right polarized signal in the first control stage, the left polarized signal is $\Delta\tau$ ahead of the right polarized signal in the second control stage, the left polarized signal is $2\Delta\tau$ ahead of the right polarized signal in the third control stage, the left polarized signal is $\Delta\tau$ behind the right polarized signal in the fourth control stage, and the left polarized signal is $2\Delta\tau$ behind the right polarized signal in the fifth control stage.

13. The interference canceler of claim 12 wherein the plurality of serially coupled complex multiplier and control stages comprise five complex multiplier and control stages, and wherein the plurality of delay lines provide a five tap transversal filter.

14. The interference canceler of claim 13 wherein the left polarized signal is $2\Delta\tau$ ahead of the right polarized signal in the first control stage, the left polarized signal is $\Delta\tau$ ahead of the right polarized signal in the second control stage, the left polarized signal is in step with the right polarized signal in the third control stage, the left polarized signal is $\Delta\tau$ behind the right polarized signal in the fourth control stage, and the left polarized signal is $2\Delta\tau$ behind the right polarized signal in the fifth control stage.

15. The interference canceler of claim 12 wherein each complex multiplier and control stage comprises:

left and right summing devices for receiving the left and right input signals, respectively, at first inputs thereof;

left and right correlators respectively coupled to outputs of the left and right summing devices;

left and right amplitude limiters respectively coupled to outputs of the left and right summing devices, and wherein respective outputs of the left and right amplitude limiters are coupled by way of left and right adjustment delay circuits to second inputs of the right and left correlators, respectively;

left and right integrators respectively coupled to outputs of the left and right correlators;

left and right gain-phase adjustment circuits respectively coupled to outputs of the left and right integrators;

left and right complex multipliers respectively coupled to outputs of the left and right gain-phase adjustment circuits and whose respective outputs are coupled to second inputs of the respective left and right summing devices.

16. The interference canceler of claim 15 wherein the gain-phase adjustment circuits align the phases of the correlator and the complex multiplier with respect to each other.

* * * * *